United States Patent [19]
Akeel et al.

[11] Patent Number: 5,286,160
[45] Date of Patent: Feb. 15, 1994

[54] METHOD AND SYSTEM FOR CONSTRAINING AND FOR OPENING, HOLDING AND CLOSING A HINGED MAGNETIC MEMBER OF A BODY

[75] Inventors: Hadi A. Akeel, Rochester Hills; Richard A. McCann, Union Lake; James S. Hager, Troy, all of Mich.

[73] Assignee: FANUC Robotics North America, Inc., Auburn Hills, Mich.

[21] Appl. No.: 850,406

[22] Filed: Mar. 11, 1992

[51] Int. Cl.$^5$ ............................................. B25J 15/06
[52] U.S. Cl. .................................. 414/744.3; 118/326; 118/500; 414/744.5; 414/786; 901/7; 901/40
[58] Field of Search ................ 414/744.2, 684.3, 786, 414/744.3; 118/326, 500; 901/7, 40, 43, 15

[56] References Cited

U.S. PATENT DOCUMENTS

| | | |
|---|---|---|
| 4,342,536 | 8/1982 | Akeel et al. |
| 4,498,414 | 2/1985 | Kiba et al. |
| 4,546,724 | 10/1985 | Kiryu et al. |
| 4,743,159 | 5/1988 | Inamori |
| 4,946,336 | 8/1990 | Larsson |
| 4,988,260 | 1/1991 | Kiba et al. |
| 5,014,644 | 5/1991 | Yamamoto et al. |

Primary Examiner—Michael S. Huppert
Assistant Examiner—Donald W. Underwood
Attorney, Agent, or Firm—Brooks & Kushman

[57] ABSTRACT

Method and system are provided wherein a process robot moves the door of a vehicle to an open position, performs a robotically controlled process within the vehicle and then moves the door back to a closed position. A separate, two-axis programmable arm holds the door in the open position. In particular, the process robot has attached thereto a tool extension whereby the process robot goes in through a window opening of the door of the vehicle, executes a door open path where the door contacts the inner panel of the door and opens the door over a magnetic holder positioned on the two-axis programmable arm below the bottom of the door. The magnet is of sufficient magnetic strength to accurately hold the door at the programmed holding position of the two-axis arm. The process robot then performs a production operation (i.e. painting, priming, sealing, etc.) within the vehicle. The process robot then inserts the tool extension into the window slot of the door and closes the door without touching the processed surfaces of the vehicle.

16 Claims, 7 Drawing Sheets

METHOD AND SYSTEM FOR CONSTRAINING AND FOR OPENING, HOLDING AND CLOSING A HINGED MAGNETIC MEMBER OF A BODY

TECHNICAL FIELD

This invention relates to methods and systems for constraining and for opening and closing a hinged member of a body and, in particular, to methods and systems for constraining and for robotically opening and closing a door of a body and holding the door open without contacting the door.

BACKGROUND ART

A typical application where a fully automated door opening, holding, closing system is required is inside the paint booth of an automatic production plant. While painting a vehicle with a robotic manipulator, it is dangerous for a human to be inside its working envelope. During the painting cycle, doors must be opened and accurately held to a known position. This allows the robot to execute pre-taught paths to apply paint on the inside of the door and around trim locations consistently and without crashing into the vehicle door. Afterwards, the door must be closed to complete the paint application to the exterior and allow for the vehicle to index through the profile into and out of the booth.

One approach is illustrated in FIG. 1 wherein a two-position (either open or closed), non-servo, pneumatically controlled arm 10 pivots about an axis 11 with a gripper 12 which grabs special fixture or tooling 14 attached to a vehicle door 16 is shown. This is a conventional approach that the assignee of the present application uses in its paint booths.

The two position, non-servo controlled opening device, however, requires the attachment of fixtures to hold the vehicle door open. Fixtures are costly and require frequent maintenance. Also, the pivot axis of this device must be located directly under the door hinge. This area is typically one of the worst locations for overspray contamination. At this position the unit itself must be frequently cleaned and reliability decreases.

Another approach is illustrated in FIG. 2 wherein a retractable pin 18 is attached to a two-axis, electric, servo-controlled manipulator 20, which is inserted through the window slot of the car door 22. The manipulator 20 is generally programmable within the radius determined by the pivot lengths of its two arms combined. Determining the position of the door window slot prior to inserting the pin 18 on the manipulator 20 is achieved via a seek routine requiring a proximity switch to actuate as a hook approaches the door 22. This method of holding the door 22 does not require fixtures on the vehicle door 22 and does allow for the two-axis manipulator 20 to hold, open and close the door 22.

A similar approach is to use a retractable pin on a two-axis, electric, servo-controlled manipulator which uses the window slot for opening, holding and closing. The key difference is the original door window slot position, prior to inserting the pin, requires the tooling on the end of the manipulator to touch the inner panel of the door. Upon contact with the door the signal to drop the pin is executed.

One disadvantage of these two approaches is that the retractable pin with sensor is a costly method with some undesirable features. The pin contacts the door while holding it open. By virtue that it must contact the item being painted, the pin at some point is in direct line with the paint spray. This causes contamination of the pin and after a few paint cycles the pin requires cleaning.

Secondly, placing the pin in the window slot requires a sensing method. Typically, a door position, when it indexes into the booth, is not known within the tolerance zone required for placing a pin in a window slot. Therefore, the door position must be determined for each vehicle when it enters the booth prior to inserting the pin in the slot. Sensors add cost, reduce reliability and require additional cycle time to open a door.

A third approach is disclosed in the U.S. Pat. No. 4,946,336 to Larsson. Larsson utilizes a three-axis, servo controlled manipulator with a rare earth magnet. The magnet is mounted below the bottom edge of the door. The magnet draws the door over it, then uses a feedback control loop to get within a known distance and attitude (tilt) of the bottom edge of the door to generate enough force to open, hold and close the door.

The Larsson unit is the highest cost of the above-mentioned approaches for holding a door for painting. The Larsson unit requires a complex feedback loop because the gap between the bottom of the door and the magnet must be closely controlled to generate energy to handle the inertia and door detent forces experienced while opening and closing the door. Two servo axes are required just to achieve this feature. The third axis is dedicated to simulate the arc of the door. This requires the base of the unit to be placed underneath the door pivot hinge. This location exposes the unit to some of the worst overspray and contamination in the booth.

Another reason for requiring a controlling gap is to compensate for an inefficient use of the magnetic energy. To maximize the energy of the magnet holding force on the door, the magnet should follow the bottom edge of the door over the entire length of the magnet. There is no provision on the Larsson unit to allow the magnet to "find" the line of the door. Therefore, if the hinge of the door is not directly over the pivot of the base of the Larsson unit, the line of the magnet will not match that of the door at the open, held position. In a typical production environment, given the accuracy of the conveyor, body carrier, vehicle and body carrier positioners it is not unusual to find body positions varying between +/−25.0 mm.

The U.S. Pat. No. 4,498,414 to Kiba et al. and Kiryu et al. U.S. Pat. No. 4,546,724 both disclose a process robot having a tool extension thereon for opening and closing the door. However, there is no discussion of any mechanism for holding the door in its open position.

Other U.S. patents of a more general interest include U.S. Pat. No. 4,342,536 to Akeel et al; U.S. Pat. No. 4,743,159 to Inamori; U.S. Pat. No. 4,988,260 to Kiba et al and U.S. Pat. No. 5,014,644 to Yamamoto et al.

SUMMARY OF THE INVENTION

An object of the present invention is to provide a method and system for opening, holding and closing a hinged member of a body wherein a process robot moves the hinged member to an open position, performs a process within the body and, thereafter, moves the hinged member from the open position to a closed position while a magnetic holder is located at a holding position immediately adjacent the open position of the hinged member.

Another object of the present invention is to provide a method and system, including a process robot for opening and closing a hinged member, as well as performing a robotically controlled process within a body of the hinged member and, wherein a separate programmable arm, having at least one axis, includes a magnetic holder at a holding position to hold the hinged member open immediately adjacent the holding position without contacting the hinged member.

Yet still another object of the present invention is to provide a method and system, including a process robot which opens and closes a hinged member and performs a robotically controlled process within the body in an open position of the hinged member and wherein the body is movable and wherein a programmable arm is mounted for movement with the hinged member on a track.

Another object of the invention is to provide a method for holding a ferromagnetic body having motion constraints at a location in space by means of a magnet without physical contact between the ferromagnetic body and the magnet.

In carrying out the above objects and other objects of the present invention a method is provided for constraining a first point on a ferromagnetic body to a position in space defined by a second point reachable by the first point by virtue of the constrained movement of the magnetic body. The method includes the step of locating a magnet adjacent the second point wherein the resultant magnetic force of attraction between the magnet and the magnetic body, when the first point is located at the second point, has a directional vector substantially parallel to a first axis and, wherein the magnet and the magnetic body are prevented from contacting each other by constraints limiting their movement along the first axis. The method also includes the step of moving the magnetic body such that the first point is at a third point adjacent the second point and the force of attraction between the magnet and said magnetic body is adequate to move the magnetic body from the third point towards the magnet to minimize the distance between the first and second points.

In carrying out the above objects and other objects of the present invention, a method is provided for opening, holding and closing a hinged magnetic member of a body to allow a process to occur therein at a process station. The method includes the steps of providing a magnetic holder at a holding position, providing a process robot with a tool and moving the robot through a first programmed path so that the tool contacts the member. The method further includes the steps of moving the robot through a second programmed path so that the tool moves the member from a closed position to an open position immediately adjacent the holding position, the magnetic holder having sufficient magnetic strength to hold the member in the open position in a non-contact fashion. Then the robot is moved through a third programmed path so that the tool moves away from the door and the robot performs a process within the body. The magnetic holder remains at the holding position while the robot performs the process. The robot is then moved through a fourth programmed path so that the tool contacts the member at the open position. Finally, the robot is moved through a fifth programmed path so that the tool moves the member from the open position to the closed position.

Further in carrying out the above objects and other objects of the present invention, a system is provided for performing each of the above-noted method steps.

Preferably, the magnetic holder is pivotally mounted on a programmable arm which, in turn, moves through an arm path to place the magnetic holder at the holding position.

Also, preferably, the magnetic holder is pivotally mounted on the programmable arm to permit the magnetic holder to align itself with an edge of the magnetic member.

Also, preferably, the programmable arm includes means for returning the magnetic holder to a predetermined angular position and the programmable arm is vertically adjustable.

This invention overcomes the shortcomings of prior art in many ways. For example, by attaching a tool to the process robot, the process robot can:

Go in through the window opening of the door;

Execute a door opening path where the tool contacts the inner panel of the door; and Open the door over a magnetic holder positioned on a separate, two-axis, programmable arm below the bottom of the door. As a result, no door sensing is required.

Once the door is in the magnetic field of the self-aligning, non-contact magnetic holder, the magnetic strength is sufficient to accurately hold the door at the programmed position of the two-axis arm. The process robot is no longer required and can do the painting required with the door open. At this moment, none of the hardware holding the door, contacts the car body. Therefore, contamination of the magnetic holder from direct spray by the painting does not get transferred back to the vehicle.

The accurate positioning of the door, once it is held by the magnetic holder mounted on the two-axis programmable arm, allows the process robot to return and know where the door is. This allows the process robot to insert the tool into the window slot of the door and close without touching a critical painted surface. The prior art requires sensors to find a door window slot reliably.

Preferably, the magnetic holder is allowed to freely swivel about a shaft. This feature maximizes the magnetic coupling between the door and the magnetic holder by allowing the magnetic holder to align with the bottom edge of the door for every job. By maximizing the use of the magnetic energy, the mechanism is more tolerant to varying door heights between jobs. This eliminates the need to control the gap between the door after the initial set-up.

The magnetic holder also has a fixed return feature to bring the magnet back to a known orientation and hold. This feature only requires the location of a single point or pivot axis underneath the door which, in turn, allows a line of magnets to attract themselves in alignment with the door's prevailing orientation.

By utilizing the process robot to open and close the door, the magnetic holder only holds the door. Therefore, the control of the gap between the magnetic holder and door is not as critical as is the case to open and maintain control of a moving door. Hence, the gap width tolerance can be relatively large and recognized at a relatively low cost.

Typically, a process robot is idle during a door open/close cycle. By utilizing the available axes of the process robot during this idle time, the holding mechanism can be greatly simplified adding to increased reliability at overall lower cost to the system.

Combined open/hold functionality of the system disclosed in U.S. Pat. No. 4,946,336 requires small, controlled gaps and slow acceleration/deceleration to overcome the inertia of the moving door and hinge detents through the open/close cycle. Hence, a gap sensing feature is required at additional cost and the cycle times are slowed to keep from losing the door. Also, combined open/hold functionality of the system of U.S. Pat. No. 4,946,336 requires added complexity of sensing gap and compensating for variations with servo drives.

The present invention utilizes the process robot and a separate magnetic holder for successful execution wherein a swivel or pivot axis of the magnetic holder is located at a holding position. When the magnetic holder is mounted on a two-axis manipulator, a base of the manipulator can be positioned anywhere within an outstretched radius determined by the lengths of the two arms combined. This means the magnetic holder can be placed in an area of low contamination to increase reliability and decrease maintenance.

Because the magnetic holder of the present invention preferably incorporates a two position height adjustment, the method and system accommodate a large range of body styles where significant variations in door height may occur.

When the magnetic holder is mounted on such a two-axis arm, the invention can accommodate relative motion between the car body and the base of the two-axis arm. This is an important feature for implementation of the invention into a line tracking (conveyor and car body continually moving through paint booth) system. When the relative motion is within the work envelope of the arms, no additional axes are required. This is a constraint with the system of the U.S. Pat. No. 4,946,336 to Larsson in that Larsson requires an additional linear axis which positions the base underneath the hinge pivot of the car door to achieve this feature.

The magnetic holder of the present invention never touches the door. Contamination associated through contact is thus eliminated.

The tool on the process robot (the only item that contacts the vehicle body) is never in direct line of a spray gun. Also, because the tool is mounted on the process robot, when an automatic gun washer is supplied with the system, a means for cleaning the pin is automatically available.

The overall method and system is more efficient than the prior art methods and systems. All available axes, typically seven axes for the process robot and two axes for positioning the magnetic holder, are utilized more effectively.

Also, the method and system are fixtureless. The processing plant does not require fixtures or any other type of special tooling for this application.

Finally, the expense of the magnetic holder on a swivel is much less than the expense of the above-noted prior art.

BRIEF DESCRIPTION OF THE DRAWING FIGURES

BEST MODE FOR CARRYING OUT THE INVENTION

The method and system of the invention automates the complete painting of a car body without the need for special fixturing attached to the car body. The method and system achieve this and overcomes the shortcomings and expense of other methods and systems which attempt the same.

Figure 6:
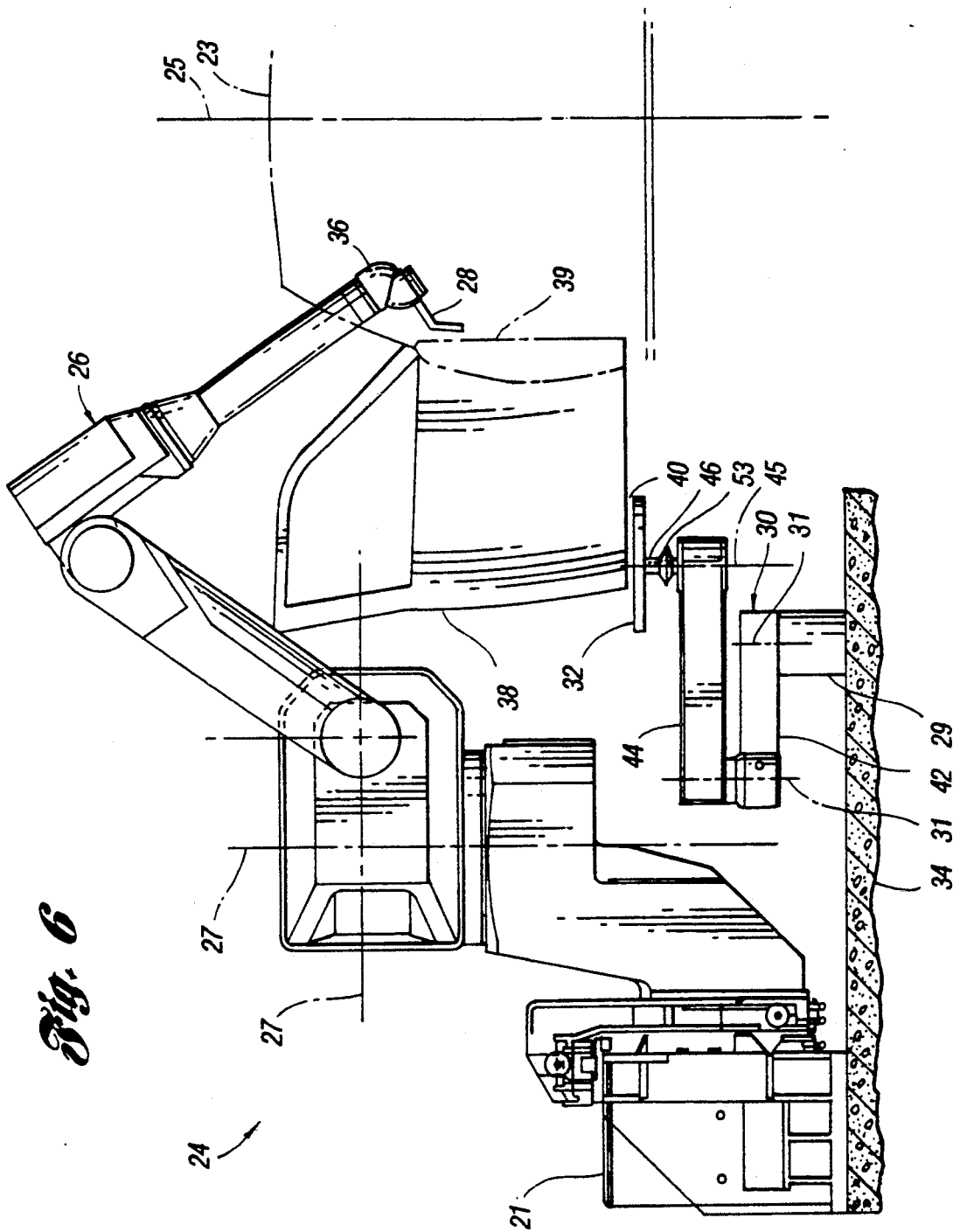
FIG. 6 is an end view, illustrating the method and system of the present invention wherein a process robot is performing a process within a vehicle car body.

Referring to FIG. 6, there is illustrated a vehicle body 23 in phantom, and a typical paint booth, generally indicated at 24 having a center line 25. A paint robot 26 having axes 27 and a tool extension 28 attached thereto is also illustrated. The robot 26 is shown mounted to a track 21 as is generally illustrated in U.S. Pat. No. 4,630,567, also assigned to the assignee of this application. A separate programmable manipulator 30 with a base 29, has two axes 31 and a magnetic tool or holder 32. The base 29 of the manipulator 30 is mounted on the floor 34 of the booth 24.

The paint robot 26 is shown in FIG. 6 executing a door open cycle. The robot 26 reaches in through the window opening, lowers its wrist 36 with the tool extension 28, then moves through a programmed door open arc or path. During the opening arc, the tool extension 28 contacts an inner panel of the door 38, thus pulling the door 38 along from its closed position (indicated in phantom at 39) to its open position (as illustrated by solid lines) where one or more magnets of a magnet or magnetic holder 32 holds the door 38 through magnetic coupling. The magnet 32 exerts a magnetic force across an air gap 40 sufficient to hold the door 38.

Figure 1:
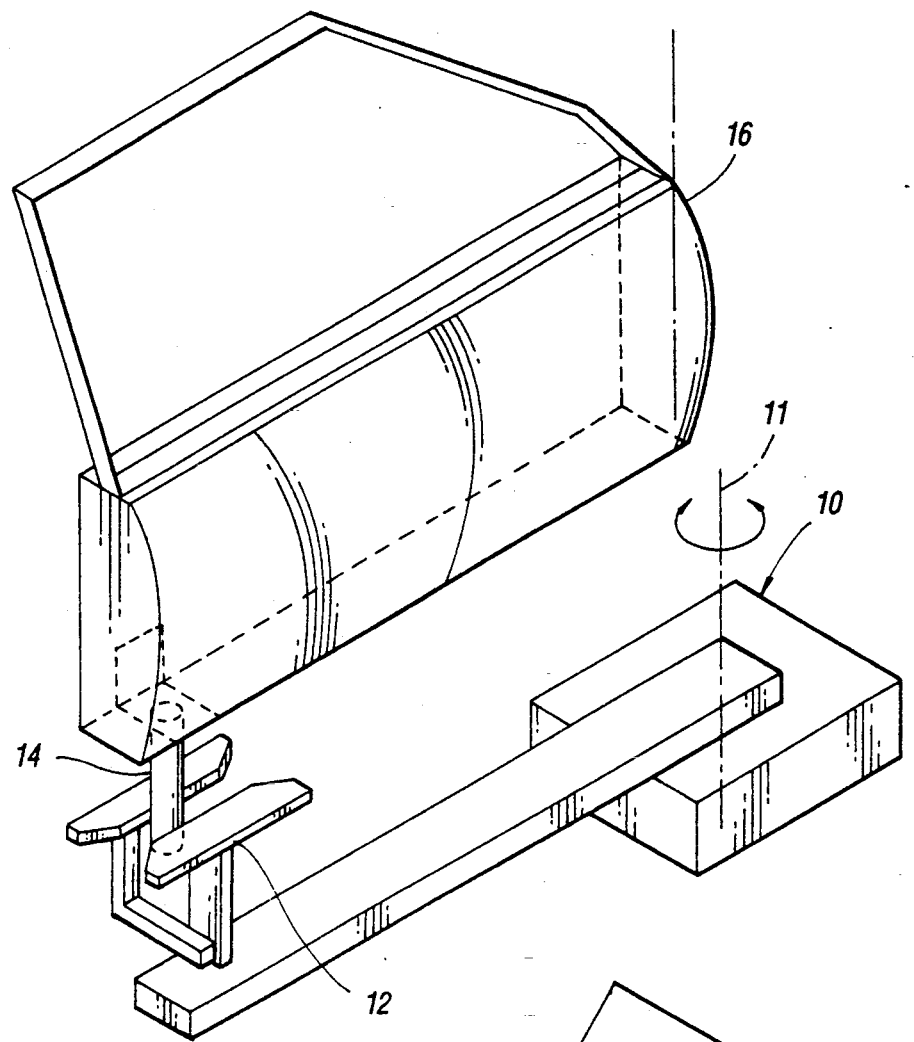
FIG. 1 is a schematic perspective view, illustrating a prior art device for opening a car body door.
Figure 2:
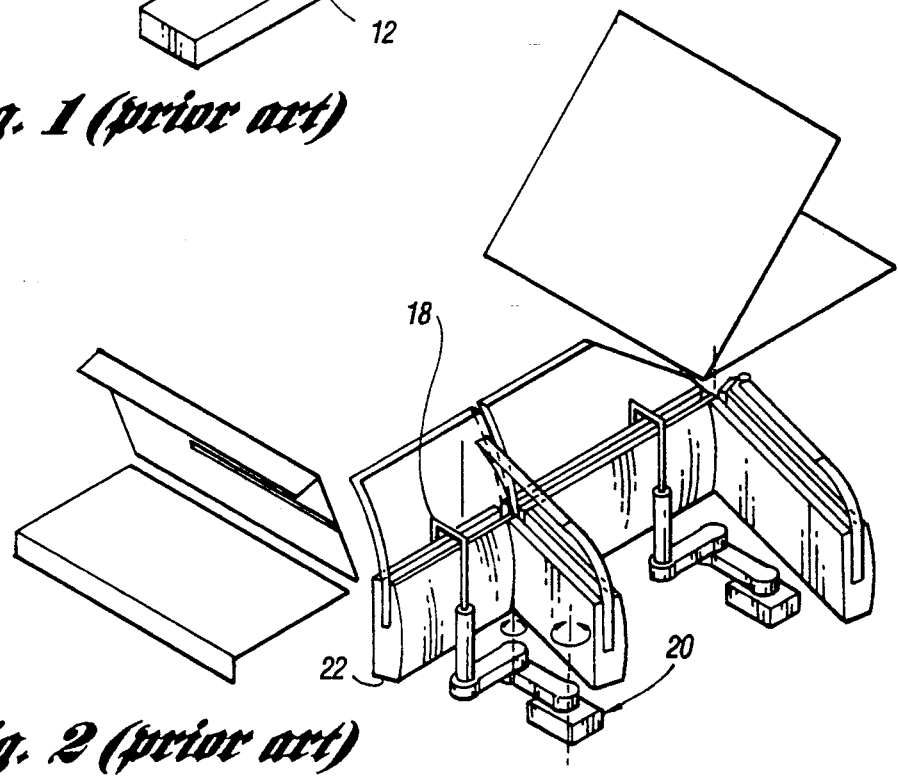
FIG. 2 is a schematic perspective view, illustrating a prior art system for opening a pair of car body doors.
Figure 3:
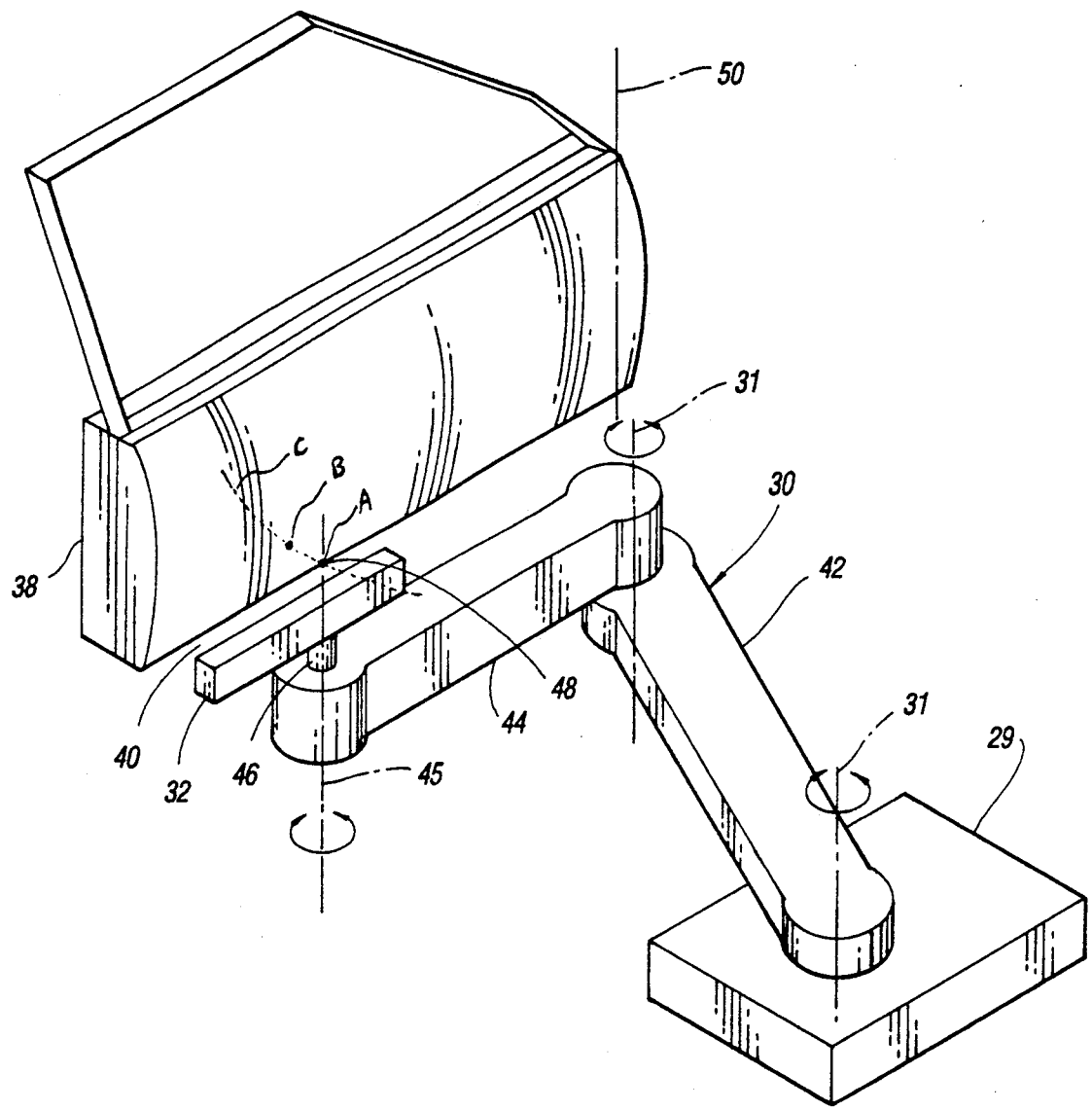
FIG. 3 is a schematic perspective view, illustrating a two-axis programmable arm for holding a car body door for use in the method and system of the present invention.

As seen in FIG. 3, to hold the car body door 38, the two-axis manipulator 30 is programmed to move its arms 42 and 44 to locate its pivot shaft 46 at a location selected as the desired door or holding position when the door 38 is opened by another manipulator (not shown in FIG. 3). In this process, the other manipulator is the paint robot 26. The magnetic holder 32, attached to the swivel shaft 46, aligns itself to the orientation of the door 38 by pivoting about an axis 45 and holds it in a position determined by a programmed point 48 of the pivot shaft 46. The location of the point 48 uniquely determines the open position of the door 38 relative to its hinge axis 50. If the car body 23 is moving on a conveyor line, the two-axis manipulator 30 can be programmed to track the conveyor movement to keep the pivot shaft 46 under the point 48 in the same relative position with the door hinge axis 50. Thus, the door open position remains constant.

In general, it is seen that a point A on the ferromagnetic body of the car door 38 can be brought in, by external means (i.e. the robot 26), to a point B, along an arc C in the vicinity of the point 48, wherein the attractive force of the magnet 32 develops enough strength to attract the ferromagnetic door 38 to minimize the distance between them when the external means releases the door 38; point A then coincides with point 48 on the axis 45. The magnet 38 and the ferromagnetic door 38 are prevented from making contact with each other by having their movement along the axis 45 constrained. In the embodiment of FIG. 3, the door 38 is constrained by its hinge and the magnet 32 is constrained by limiting or eliminating its vertical movement.

Figure 4:
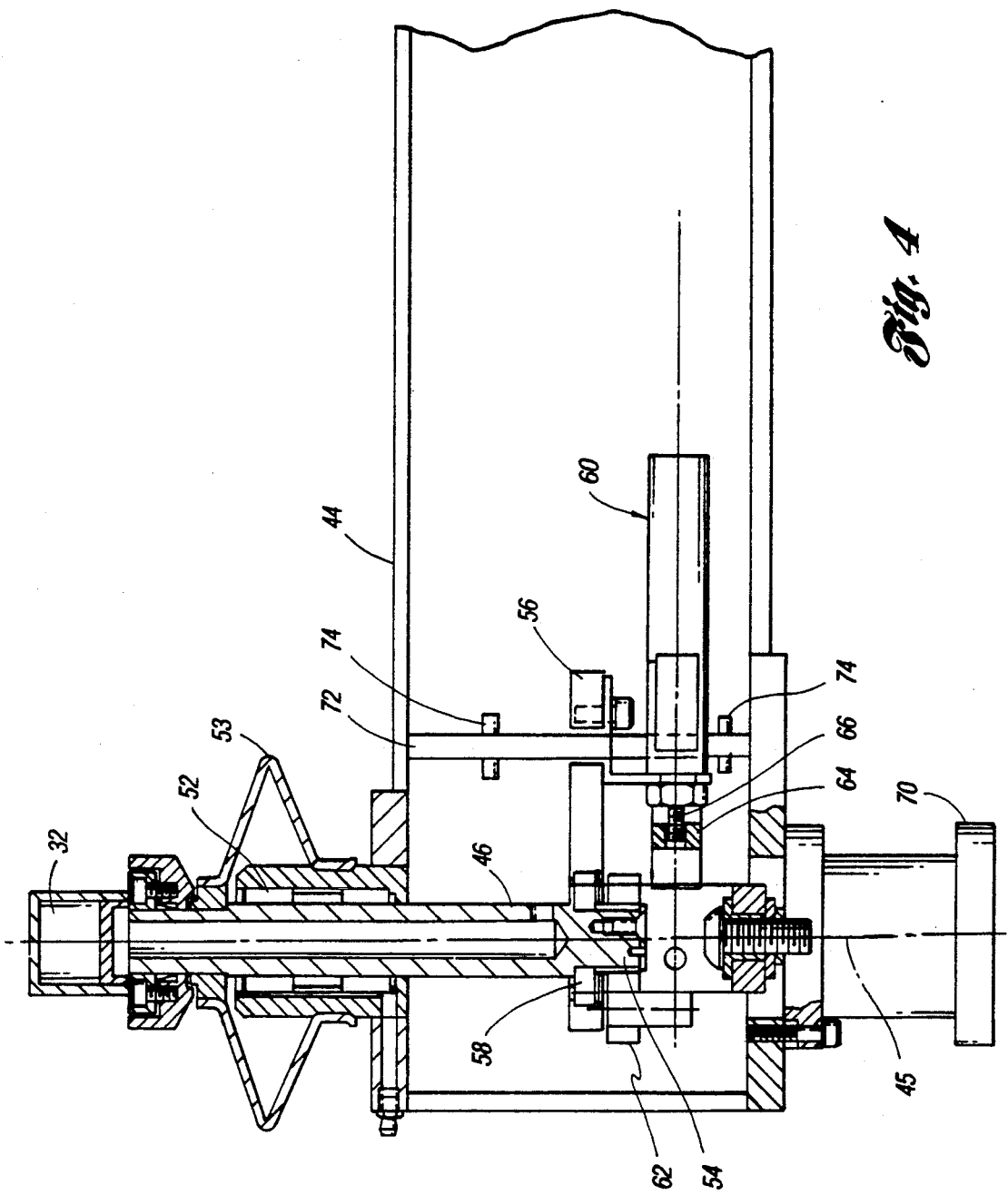
FIG. 4 is a side view, partially broken away and in cross-section, illustrating a vertical adjustment feature for the programmable arm of FIG. 3.
Figure 5:
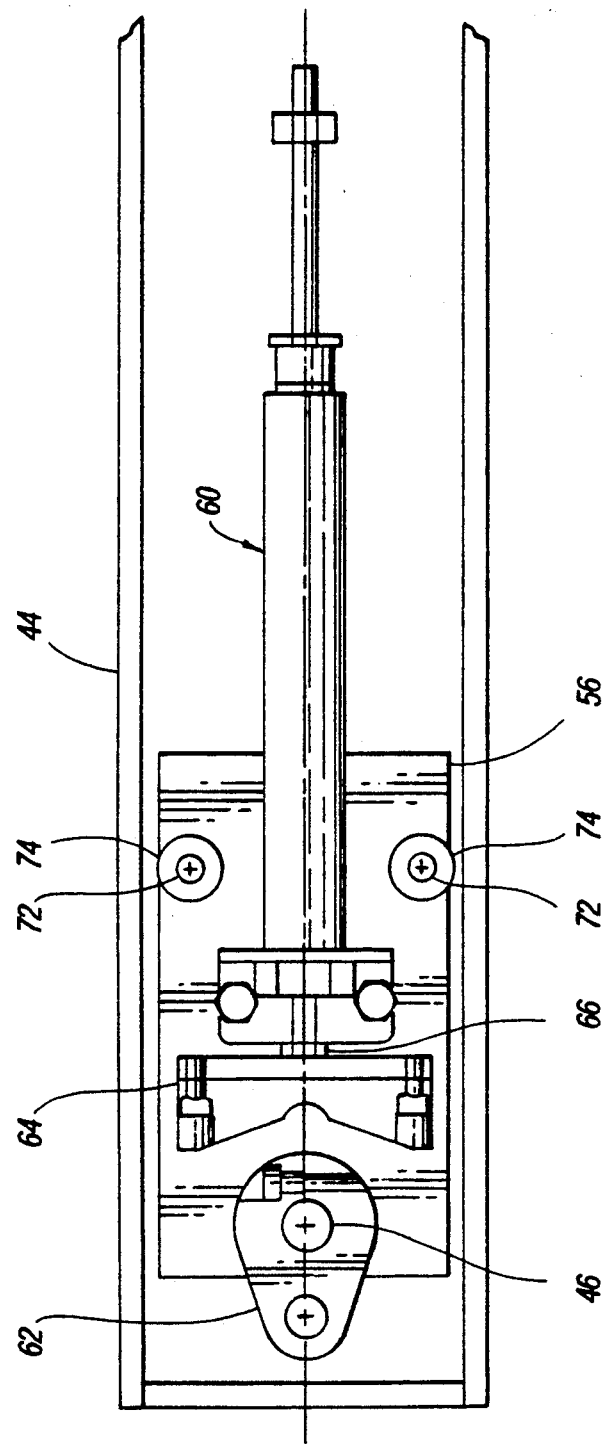
FIG. 5 is a top plan view of the magnetic holder of the present invention, illustrating the method for returning and holding the swivel or pivot axis to a known orientation.

To assure that the magnetic holder 32 is always in a desirable orientation when the door 38 is presented, the pivot shaft 46 is preferably constrained as the door 38 approaches. As illustrated in FIGS. 4 and 5, the pivot shaft 46 is supported by a main bearing 52 which is protected by a bellows 53 which permits vertical movement of the magnetic holder 32.

At the opposite end 54 of the pivot shaft 46 opposite the magnetic holder 32, there is attached a support plate 56, a tail bearing 58, an air cylinder 60 and a cam 62. The tail bearing 58 is mounted on the support plate 56 and allows the pivot shaft 46 to rotate relative to the plate 56. The cam 62 is attached to the end of the pivot shaft 46 and rotates with the shaft 46.

Attached to the plate 56 is the air cylinder 60 with a tapered block 64 attached to the output shaft 66 of the air cylinder 60. As the air cylinder 60 extends, the tapered block 64 catches the cam 62 and rotates the cam 62 to a unique orientation and holds the cam 62 at that orientation. Once the door 38 is positioned over the magnetic holder 32, the air cylinder 60 retracts and the pivot shaft 46 is free to follow the alignment of the door 38. By adjusting the return stroke of the air cylinder 60, the swivel rotation can be controlled up to 260 degrees of free movement.

An additional feature shown in FIG. 4, allows for two positions in the height of the magnetic holder 32. The shaft of a second air cylinder 70 is connected to the support plate 56. Through the use of guide bars 72 and stops 74, the height of the magnetic holder 32 in both the retracted and extended position of the cylinder 70 can be controlled. The main pivot bearing 52 is designed to allow both linear and rotary motion of the pivot shaft 46 for this purpose. All the control hardware for constraining the pivot shaft 46 is attached to the support plate 56. Therefore, rotation control is insensitive to the height of the plate 56. The current design allows for approximately 50.0 mm of height adjustment.

Figure 7:
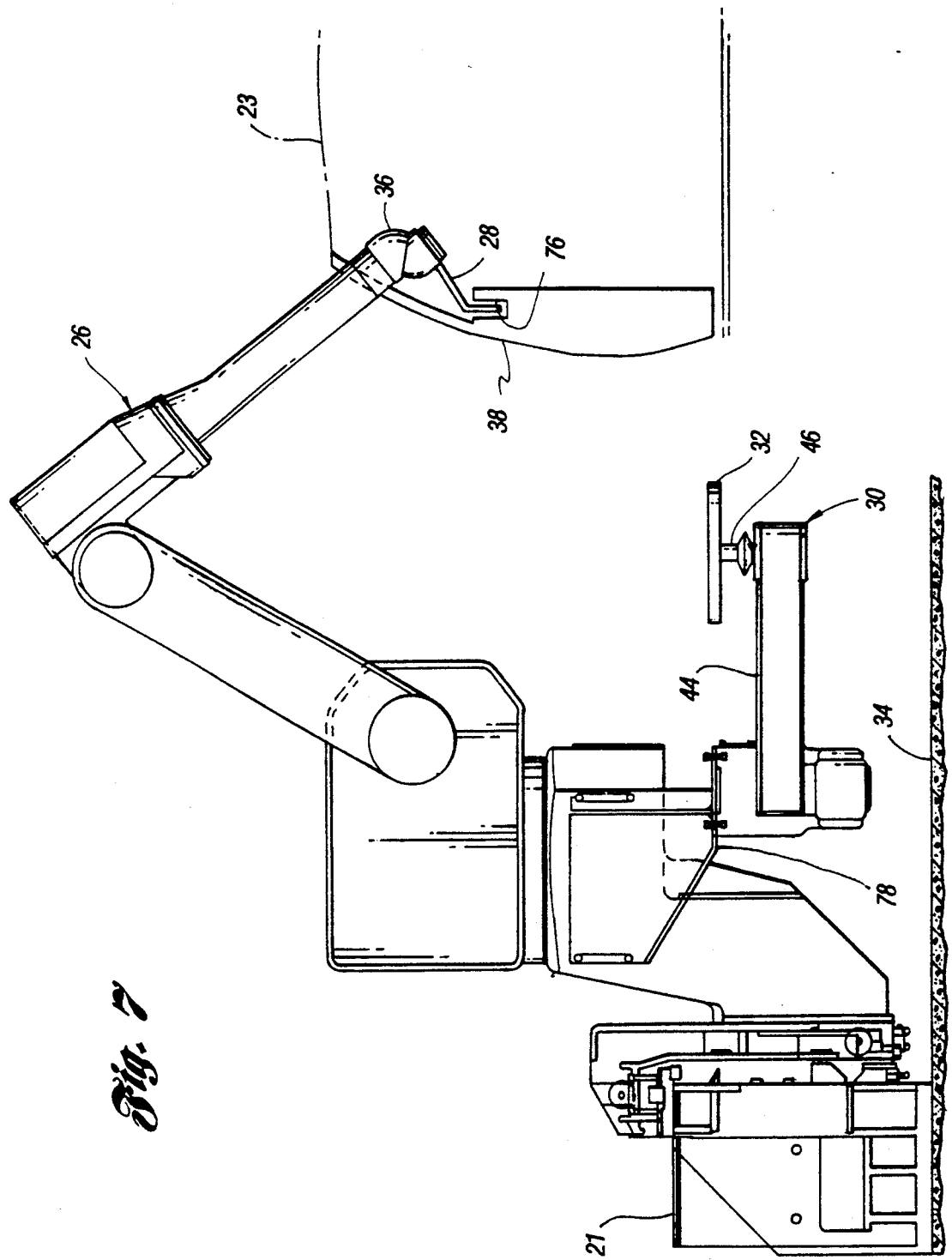
FIG. 7 is an end view, similar to the view of FIG. 6, wherein the door holding device of the present invention is mounted to move with the process robot by means of an adaptor plate.

When the door 38 requires closing, the paint robot 26 returns and inserts the tool extension 28 into a window slot 76 of the door, as shown in FIG. 7, wherein the manipulator 30 is shown mounted for movement with the robot 26 on the track 21 by means of an adaptor plate 78. With previous systems, to find the window slot 76 reliably required sensors. However, once the door 32 is presented over the magnets of the magnetic holder 32, the magnets draw the door 38 accurately over the pivot shaft 46. By knowing the exact location of the magnetic pivot shaft 46 (programmed position), the window slot opening 76 is also known.

Figure 8:
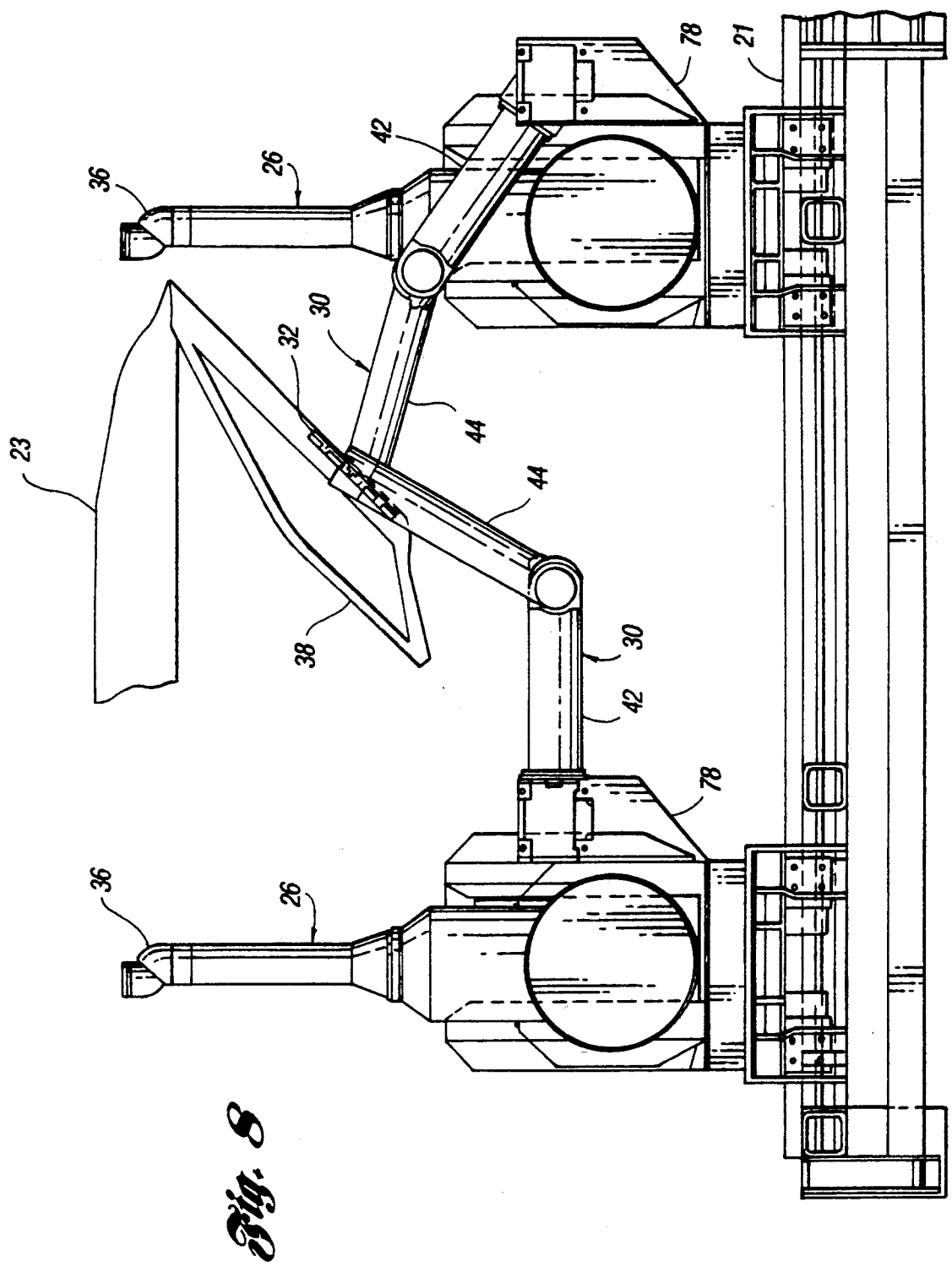
FIG. 8 is a top plan view illustrating two positions of the robot and its holding device of FIG. 7.

Another important feature of the system of the present invention is that the system can be adapted to a moving line system by attaching to the seventh axis of the paint robot 26 with the adaptor plate or bracket 78, as shown in FIGS. 7 and 8. The paint robot 26 can traverse along the rail or track 21 at varying speeds with respect to the moving line shown in FIG. 8 wherein two positions of the manipulator 30 are shown.

Previous systems require an additional axis to achieve this capability. The Larsson system (i.e. U.S.-Pat. No. 4,946,336) needs both an additional axis and a track, since the mechanism, as designed, must be mounted underneath the door hinge.

Without departing from the scope of the present invention, it is to be understood that when the car body 23 is stopped at a paint station in the paint booth 24, a fixed magnet pivot 46 located at the desired door-open position may be used when such position is unique for all car bodies.

Also, when the hinge line or axis 50 can be uniquely located for all car bodies but the angle of door opening varies, a single axis hinged arm 44 fitted with a magnetic holder 32 on a pivot shaft 46 (rather than the manipulator 30) can be located with its hinge axis 31 in alignment with the unique door hinge line 50 to accommodate different car bodies of varying door opening angles by positioning the single axis hinged arm 44 at a plurality of angles that correspond to the varying door opening angles.

When car bodies are stopped, but vary in the location of the door hinge line 50, a two-axis delivery device, such as shown at 30 in FIG. 3, may be used. These two axes of such a device may also be linear.

Finally, for a moving car line, track mounted devices or manipulators as shown in FIGS. 7 and 8 may be used.

The method for painting interior surfaces of car bodies involves the following steps:

1. Fitting a robotic painting device (i.e. the paint robot 26) with a tool extension 28 that attaches to its wrist 36.
2. Using the paint robot 26 to reach inside car bodies 23, through window openings or under hoods and deck-lids, to a non-painted surface to make contact with the openable car member, e.g., doors, deck-lids, or hoods by means of the tool extension 28.
3. Moving the paint robot 26 with its tool extension 28 along a pre-programmed path that effects the opening of the openable car member and its delivery to a "terminal location" or door open position immediately adjacent a holding position.
4. Locating a magnetic attraction device, such as the magnetic holder 32, at the terminal location where the openable member (i.e. door 38) is to be located.
5. Verifying that the openable member has been attracted to and held by the device holder.
6. Moving the paint robot 26 away from the openable member (with option to retract the tool extension, or fold it, into the robot arm).
7. Initiating an interior body painting program.
8. When interior and trim/edge painting is finished, moving the paint robot 26 with its tool extension 28 extended to the openable member where it is inserted into the openable member in a location that is supportable of closing forces and away from painted surfaces (i.e. the window slot 76) (i.e. for doors: inside window slots, inner panel holder, keyhole, or to specially added features or fixtures;

for hoods and deck-lids: inside panel, latch, lock opening, or a specially added fixture or fixtures).

9. Closing the openable member and moving the paint robot 26 away from the openable member.

While a preferred embodiment of the subject invention has been shown and described in detail, those skilled in this art will recognize various alternative designs and embodiments for practicing the present invention as defined by the following claims.

What is claimed is:

1. A method for constraining a single first point (A) on a ferromagnetic body to a position in space defined by a second point (48) reachable by said first point by virtue of the constrained movement of said ferromagnetic body, the method comprising the steps of:

locating a magnet (32) adjacent said second point (48) wherein the resultant magnetic force of attraction between said magnet and said ferromagnetic body, when said first point is located at said second point, has a directional vector that intersects a first axis (45), and, wherein said magnet and said body are prevented from contacting each other by constraints limiting their movement along said first axis; and moving said ferromagnetic body such that said first point is at a third point (B) adjacent said second point and the force of attraction between said magnet and said ferromagnetic body is adequate to move said ferromagnetic body from said third point towards said magnet to minimize the distance between said first and second points, wherein said ferromagnetic body is elongated and said magnet is elongated and pivoted to rotate angularly about said first axis such that the step of moving causes said elongated magnet to rotate about said first axis and align itself with said elongated ferromagnetic body.

2. The method of claim 1 wherein said ferromagnetic body is hinged to rotate about an axis substantially parallel to said first axis.

3. A method for opening, holding and closing a hinged magnetic member of a body to allow a process to occur therein at a process station, the method comprising the steps of:

providing a magnetic holder mounted for pivotal movement about a pivot axis to align itself with an edge of the member at a holding position at the process station;

providing a process robot with a tool;

moving the robot through a first programmed path so that the tool contacts the member;

moving the robot through a second programmed path so that the tool moves the member from a closed position to an open position immediately adjacent the holding position, the magnetic holder having sufficient magnetic strength to hold the member in the open position in a non-contact fashion;

moving the robot through a third programmed path so that the tool moves away from the member and the robot performs the process within the body, wherein said magnetic holder remains at the holding position while the robot performs the process;

moving the robot through a fourth programmed path so that the tool contacts the member at the open position; and moving the robot through a fifth programmed path so that the tool moves the member from the open position to the closed position wherein the step of providing the magnetic holder at the holding position includes the steps of:

providing a programmable arm supporting the magnetic holder; and moving the programmable arm through an arm path so that the magnetic holder is located at the holding position, wherein the magnetic holder is pivotally mounted on the programmable arm to permit the magnetic holder to pivot about the pivot axis from a predetermined angular position.

4. The method as claimed in claim 3 wherein the programmable arm includes means for returning the magnet to the predetermined angular position.

5. The method as claimed in claim 3 or claim 4 wherein the programmable arm is adjustable in a substantially vertical direction.

6. The method as claimed in claim 3 or claim 4 wherein the method further comprises the step of providing a track wherein the robot and the programmable arm are mounted for movement along the track.

7. The method as claimed in claim 6 wherein the robot and the programmable arm are mounted for movement in unison along the track.

8. A system for opening, holding and closing a hinged magnetic member of a body to allow a process to occur therein at a process station, the system comprising:

a magnetic holder mounted for pivotal movement about a pivot axis to align itself with an edge of the member at a holding position at the process station;

a process robot having a tool and capable of moving along a first programmed path so that the tool contacts the member, along a second programmed path so that the tool moves the member from a closed position to an open position immediately adjacent the holding position, the magnetic holder having sufficient strength to hold the member in the open position in a non-contact fashion, along a third programmed path so that the tool moves away from the member and the robot performs a process within the body, along a fourth programmed path so that the tool contacts the member at the open position and along a fifth programmed path so that the tool moves the member from the open position to the closed position of the member wherein the open position remains immediately adjacent the holding position while the robot performs the process wherein the system further comprises a programmable arm for supporting the magnetic holder, the programmable arm moving through an arm path to position the magnetic holder at the holding position, and wherein the magnetic holder is pivotally mounted on the programmable arm to permit the magnetic holder to pivot about the pivot axis from a predetermined angular position.

9. The system as claimed in claim 8 wherein the programmable arm includes means for returning the magnetic holder to the predetermined angular position.

10. The system as claimed in claim 8 or claim 9 wherein the programmable arm is rotatable about a pair of substantially vertical non-coincident parallel axes.

11. The system as claimed in claim 8 or claim 9 wherein the programmable arm is vertically adjustable.

12. The system as claimed in claim 8 or claim 9 wherein the system further comprises a track wherein the robot and the programmable arm are mounted for movement on the track.

13. The system as claimed in claim 12 wherein the robot and the programmable arm are mounted for movement in unison along the track.

14. A method for constraining a first point (A) on a ferromagnetic body to a position in space defined by a second point (48) reachable by said first point by virtue of the constrained movement of said ferromagnetic body, the method comprising the steps of:

locating a magnet (32) adjacent said second point (48) wherein the resultant magnetic force of attraction between said magnet and said ferromagnetic body, when said first point is located at said second point, has a directional vector that intersects a first axis (45), and, wherein said magnet and said ferromagnetic body are prevented from contacting each other by constraints limiting their movement along said first axis; and moving said ferromagnetic body such that said first point is at a third point (B) adjacent said second point and the force of attraction between said magnet and said ferromagnetic body is adequate to move said ferromagnetic body from said third point towards said magnet to minimize the distance between said first and second points wherein said ferromagnetic body is elongated and said magnet is elongated and pivoted to rotate angularly about said first axis such that the step of moving causes said elongated magnet to rotate about said first axis and align itself with said elongated ferromagnetic body.

15. The method of claim 14 wherein said ferromagnetic body is hinged to rotate about an axis substantially parallel to said first axis.

16. A system for opening, holding and closing a hinged magnetic member of a body to allow a process to occur therein at a process station, the system comprising:

a magnetic holder located at a holding position at the process station;

a process robot having a tool and capable of moving along a first programmed path so that the tool contacts the member, along a second programmed path so that the tool moves the member from a closed position to an open position immediately adjacent the holding position, the magnetic holder having sufficient strength to hold the member in the open position in a non-contact fashion, along a third programmed path so that the tool moves away from the member and the robot performs a process within the body, along a fourth programmed path so that the tool contacts the member at the open position and along a fifth programmed path so that the tool moves the member from the open position to the closed position of the member wherein the open position remains immediately adjacent the holding position while the robot performs the process wherein the system further comprises a programmable arm for supporting the magnetic holder, the programmable arm moving through an arm path to position the magnetic holder at the holding position and wherein the programmable arm is rotatable about a pair of substantially vertical, non-coincident parallel axes.

* * * * *